United States Patent Office 3,353,668
Patented Nov. 21, 1967

3,353,668
**METHOD FOR IMPROVING THE
BRIGHTNESS OF CLAY**
James B. Duke, Metuchen, N.J., assignor to Mineral &
Chemicals Philipp Corporation, Menlo Park, N.J., a
corporation of Maryland
No Drawing. Filed Dec. 16, 1963, Ser. No. 330,634
20 Claims. (Cl. 209—10)

This application is a continuation-in-part of my application Ser. No. 236,685, now abandoned, filed Nov. 9, 1962.

This invention relates to methods for improving the brightness of clay and relates, more specifically, to methods for improving the brightness of a particular type of sedimentary clay material, namely, so-called "gray kaolin clay."

Gray kaolin clays have a distinctly gray tinge which readily distinguishes this type of kaolin clay from other kaolins which have a white or sometimes orange tinge. Still another distinctive characteristic of gray kaolins is that they are usually considerably finer than other kaolins. By way of example, in a typical gray Georgia kaolin about 50 percent by weight of the particles are finer than 0.4 micron (as determined by conventional sedimentation procedure) as compared with a white Georgia kaolin crude in which about 50 percent by weight of the particles are finer than 1.5 microns. It might be logical to expect that gray kaolin could readily be distinguished from white kaolin clay on the basis of chemical analysis. This, however, is not the case, for there exist kaolin clays of substantially identical chemical analysis, inclusive of iron, titania and carbon content; nevertheless, one clay will be distinctly gray and the other one white.

For many applications, the value of a clay depends on its brightness. Colored impurities, usually ferruginous and titaniferous in nature, are invariably associated with sedimentary clays. These impurities detract from the brightness of the clay, even when they are present in small quantities, such as 1 percent to 3 percent of the clay weight. The value of the clay is decreased substantially in proportion to the amount of colored impurities present.

To improve the brightness of sedimentary clays adapted for use as a pigment in paper coating compositions or in light colored and white paints, etc., the clay is beneficiated to some extent by one, and sometimes a plurality, of techniques. Commercial methods for improving the brightness of clay may be broadly grouped as follows: chemical bleaching methods, the most commonly used being hydrosulfite bleaching, which operates to reduce iron contaminants in the clay to soluble ferrous compounds but which has little effect on the titanium content; electrophoretic refinement, as by an osmotic apparatus; and controlled sedimentation to isolate the fine brighter fraction of the clay. Froth flotation, especially the so-called "Ultraflotation" or "carrier" froth flotation procedure described in U.S. 2,990,958, of which the inventor in this application is a coinventer, is also used commercially in brightening some kaolin clays, especially discolored white kaolin clay.

The aforementioned methods, alone or in combination, have been found to be incapable of bringing about a substantial improvement in the brightness of gray kaolins. Thus, in spite of the fact that gray kaolins contain a large percentage of fine size particles especially useful for paper coating purposes, such clay cannot be brightened to a level adequate for commercial high grade paper coating use by hydrosulfite bleaching alone or the aforementioned froth flotation technique in conjunction with hydrosulfite bleaching. Prior to the discovery of the flotation process of U.S. 3,072,255, of which I am a coinventor, no commercially feasible method had been found for improving significantly the brightness of gray kaolin clay and the clay was generally considered to be a waste material. In accordance with the process of U.S. 3,072,255, an aqueous slip of gray kaolin clay is given a preliminary treatment with hydrogen sulfide gas to place the slip in a condition such that it is markedly more responsive to the carrier flotation process of U.S. 2,990,958. In putting the process into practice, a dispersed slip of gray kaolin clay is sulfidized and then the dispersed sulfidized slip is conditioned for froth flotation with the following combination of flotation reagents: (1) a negative-ion collector reagent capable of selectively oiling colored impurities in the clay and (2) finely divided particles of a solid material capable of floating in the reagentized pulp (e.g., minus 325 mesh calcite). The auxiliary solid particles apparently induct or promote the flotation of those oiled colored impurities of the clay which normally are not amenable to air-bubble attachment and flotation. The colored impurities report in the froth product in intimate association with the auxiliary solid particles which function, in effect, as a carrier for the impurities. The machine discharge product of the flotation treatment is a concentrate of clay of enhanced purity and brightness. This clay material can be further brightened to some extent by hydrosulfite bleaching. The brightness of the gray kaolin clay processed in this manner frequently leaves something to be desired. The process is also open to the objection that the hydrogen sulfide is a hazard in the flotation plant because of its odor and physiological effects. Moreover, the sulfide reagent corrodes metals which are usually used in flotation operations and, therefore, special flotation equipment must be employed.

A general object of this invention is the provision of novel methods for improving the brightness of gray kaolin clays to exceptionally high levels.

Another object is the provision of a means for activating gray kaolin clay for bleaching with a reducing bleach agent, whereby the activated gray clay is more responsive to the action of the reducing bleach agent.

Still another object of this invention is the provision of a novel method for activating gray kaolin clay for froth flotation of colored impurities which obviates the need for a hydrogen sulfide treating step.

A further object is the provision of a method for activating a slip of gray kaolin clay whereby the slip is more responsive to subsequent carrier flotation and subsequent reducing bleach treatment.

Another object is the provision of a method for beneficiating gray kaolin clay by froth flotation in conjunction with chemical bleaching, whereby the clay is bleached simultaneously while flocculating the aqueous pulp of beneficiated clay to facilitate filtration and drying of the clay.

A specific object is the provision of a method for converting gray kaolin clay into a beneficiated clay material suitable for use as a paper coating pigment.

Further objects and features of this invention will be apparent from the description thereof which follows.

Stated briefly, in accordance with this invention, a water-soluble inorganic compound which contains in its molecule readily available oxygen which is capable of directly oxidizing ferruginous matter normally associated with gray kaolin clay, especially a soluble permanganate salt, is incorporated into an aqueous slip of gray kaolin and the slip is agitated until colored impurities in the clay are oxidized. The gray clay, in the form of an aqueous slip, is subsequently subjected to the action of a reducing bleach. The clay used in the process can be raw clay as mined, a suitable size fraction of raw clay, or clay which has been partially brightened by the flotation process of U.S. 3,072,255. In accordance with a preferred form of this invention, described hereinafter, a flotation step, especially a carrier flotation step, is applied to the clay slip after treatment with the oxidizing compound and before treatment with reducing bleach. In this case, it is preferable to flocculate the flotation beneficiated clay with sulfur dioxide, thereby simultaneously bleaching the oxidized, flotation beneficiated clay.

Gray kaolin clay can be brightened to levels not possible with hydrosulfite bleaching reagent alone by preconditioning the slip with permanganate ion before subjecting the slip to the action of hydrosulfurous compound bleaching reagent, in accordance with this invention. Thus, whereas the brightness index (defined hereinafter) of a representative Georgia gray kaolin was improved by less than 2 percent by hydrosulfite bleaching alone, the clay brightness index was improved by 3½ percent to 4 percent as a result of the preliminary use of permanganate ion. In effect, the hydrosulfite bleach was about twice as effective when it was applied to a gray kaolin slip that had been previously treated with permanganate ion. Gray kaolin which has been previously brightened somewhat by froth flotation, e.g., the process of U.S. 3,072,255, can be further brightened to a remarkable brightness index by the process of this invention to obtain a clay product which compares favorably in brightness to many high quality chemically bleached white sedimentary kaolins. By way of example, an apparently useless crude gray kaolin having a brightness of only 78.0 percent was beneficiated to 84.4 percent brightness by froth flotation in accordance with the process of U.S. 3,072,255 and was further brightened to a value of 88.8 percent by the process of this invention. In the absence of permanganate treatment this particular beneficiated crude could be brightened to a brightness value of 86 percent by the reducing bleach.

While the pretreatment of the clay slip with permanganate ion increases the effectiveness of the hydrosulfurous compound bleaching reagent in the case of gray kaolin, it was surprising and unexpected that the same result was not realized when various discolored white kaolins were processed in the same manner. To the contrary, the brightness of white kaolin subjected to permanganate or other oxidizing treatment before hydrosulfite bleaching was generally no greater than the brightness of the same white kaolin subjected to the action of the hydrosulfite bleach alone. By way of example, a discolored white Georgia kaolin which was brightened from a brightness index value of about 80 percent to a brightness index value of 85 percent by a zinc hydrosulfite bleach could not be brightened above the 85 percent level by carrying out the permanganate ion treatment before bleaching with zinc hydrosulfite.

In accordance with a preferred embodiment of the instant invention, exceptionally bright clay products, comparable in brightness to high quality white kaolins, are obtained as follows: an aqueous slip of gray kaolin clay is simultaneously activated for both beneficiation by froth flotation and for bleaching with a reducing agent by incorporating said oxygen-containing compound into a slip of the clay before flotation and bleaching, and preferably before incorporating a dispersing (deflocculating) agent into the slip. The activated oxidized clay slip, which at this point of the process is appreciably darker in color than the slip of starting clay, is then dispersed by agitating the slip with an alkaline dispersing agent. The dispersed slip is conditioned for froth flotation with collector reagents selective to colored impurities in the clay. Preferably the slip is subjected to carrier flotation with a fatty acid collector reagent and flotatable auxiliary mineral particles in an alkaline flotation circuit as described in U.S. 2,990,958, producing a froth product which comprises colored impurities originally in the clay in intimate association with oiled auxiliary mineral particles. The machine discharge product of the flotation operation is an aqueous concentrate of dispersed clay particles which are appreciably darker than the starting clay. The dispersed clay concentrate, or a fine size fraction of said concentrate obtained by a hydraulic classification step, is then flocculated by incorporation of an acidic material therein. The flocced pulp is thickened, subjected to bleaching with a reducing agent and washed. In accordance with one form of the preferred embodiment of this invention, described immediately hereinabove, sulfur dioxide is employed as the acidic flocculating agent and it serves a supplementary function as a reducing bleach agent, whereby the machine discharge product of the flotation step whitens substantially immediately upon being flocculated with sulfur dioxide. In carrying out this form of the invention, the sulfur dioxide bleached pulp of clay can frequently be further brightened to some extent by subsequent treatment with a zinc hydrosulfite bleach.

By carrying out the preferred embodiment of the process of this invention, gray kaolin clay can be brightened to levels not possible with the carrier flotation process of U.S. 2,990,958, even when carried out in conjunction with hydrosulfite bleaching. With a representative gray kaolin clay from Georgia, the improvement in brightness obtainable by carrier flotation in conjunction with hydrosulfite bleaching was more than doubled when a slip of the clay was activated with potassium permanganate oxidizing agent before undergoing flotation and reducing bleach treatments.

An advantage of oxidizing the clay before the flotation step is that a substantially smaller quantity of oxidizing agent is required to bring about the same overall increase in brightness of gray kaolin clay when the clay is oxidized before froth flotation and then bleached with a hydrosulfurous compound. To illustrate, when potassium permanganate was used as the activating agent in amount of 4 pounds per ton of starting clay before flotation and treatment with reducing bleach, the brightness of a representative gray kaolin clay from Georgia was increased from 78.0 percent to 88.2 percent. It was found that 8.0 pounds of permanganate was required for each ton of clay in order to increase the brightness of the same gray kaolin by 10.0 percent when permanganate was added after sulfidization and flotation and before reducing bleach. In other words, the permanganate was about twice as effective when used prior to froth flotation and reducing bleach treatment.

The preferred oxidizing agent used to activate the gray kaolin for flotation and bleaching is a water-soluble permanganate salt, preferably potassium permanganate, which is readily available and produces exceptionally good results. The use of potassium permanganate in amount within the range of about ½ to 10 pounds per ton of clay is recommended. Other oxidizing agents include oxygen gas, alkali bichromates such as sodium bichromate, alkali chlorates such as sodium chlorate, alkali chlorites such as sodium chlorite, ammonium persulfate and soluble peroxides such as sodium peroxide and hydrogen peroxide. Combinations of oxidizing agents can be used. If desired, the oxidizing reagent, especially a permanganate reagent, can be formed in situ in the clay slip.

Generally speaking, the aforementioned oxidizing agents are more effective under acidic conditions and, therefore, to obtain optimum results, the oxidizing agent should be incorporated into the clay slip (which usually has a pH below 5) without addition of alkaline clay dispersants. Especially when the clay slip contains an alkaline dispersant, a mineral acid, such as hydrochloric acid, can be added to the clay slip before or subsequent to addition of oxidizing agent to adjust the pH to a value within the range of about 2.5 to about 5.0. Since flocculated clay is not amenable to the carrier flotation process, care should be exercised to prevent the formation in the oxidized slip of large flocs which cannot be redispersed. Thus, an excess of activating agent should be avoided when the activating agent has a low pH and the slip should be continuously agitated after an acidic oxidizing agent is incorporated. Agitation time will vary with the amount and type of oxidizing agent used, agitation temperature, and may vary inversely with the agitation speed. Agitation time will usually be within the limits of 10 minutes to 70 hours. With the preferred potassium permanganate oxidizing agent, agitation should be for a time sufficient to reduce completely the permanganate, causing the aqueous phase of the slip to become brown. Moderate agitation with a propeller-type agitator for about 10 hours to about 80 hours at room temperature is recommended when potassium permanganate is used. It is reasonable to expect that agitation time can be reduced by incorporating a reagent which functions to accelerate or catalyze the oxidizing action of a permanganate salt. Such reagents are well known in the art and are reported in the literature.

In putting this invention into practice, the gray kaolin is initially slipped in water, preferably without addition of a clay dispersant. The gray kaolin clay employed as a starting material in the process can be raw clay as mined, preferably raw clay which has been treated for removal of grit and undispersible agglomerates. Especially good results are obtained with a fine size fraction of gray kaolin. The clay solids content of the slip can be within the range of from about 20 percent to 70 percent. As is known to those skilled in the art, the formulation of high solids clay slips will require the use of a clay dispersing agent. Therefore, when carrying out a preferred form of the invention in which a dispersant-free clay slip is agitated with permanganate, subjected to flotation and then reducing bleach, the starting slip should be a low solids slip, e.g., a slip containing about 20 percent to 30 percent clay solids. To this slip, the oxidizing agent is added with agitation. While the oxidizing agent may be somewhat more effective at elevated temperature, for economic reasons it is preferred to permit the oxidizing agent to act on the slip at ambient temperature. However, when it is feasible, activation can be carried out at an elevated temperature below which the slip has appreciable vapor pressure. Preferably, the oxidizing agent is diluted with water before being mixed with the clay to assure uniform reaction and to minimize flocculation of solids in the slip. It will be readily apparent to those skilled in the art that the oxidation step must be carried out in equipment that is inert to the oxidizing reagent under the conditions employed during the treatment.

In carrying out a preferred form of the invention, the slip of oxidized crude gray kaolin is dispersed by incorporating one or more alkaline deflocculating agents in the slip and the slip is diluted, if necessary, to a solids content suitable for conditioning for froth flotation, typically 20 percent to 30 percent solids. Sodium silicate is eminently suitable as the deflocculating agent, especially when used in combination with sodium carbonate. Other known clay deflocculating agents, or combination of agents can be used. The slip is then conditioned with collector reagents and with auxiliary mineral particles of finely ground calcite, silica, etc., as described in U.S. 2,990,958. In most instances, it will be desirable to incorporate the auxiliary mineral particles into the dispersed clay slip before addition of collector reagents and reagentize the clay and auxiliary mineral particles simultaneously. The clay slip should be alkaline during the reagentization step and ammonium hydroxide or sodium hydroxide is added to adjust the pH of the slip to a pH within the range of about 8 to 10. Crude tall oil is recommended as the collector reagent for oiling colored impurities in the gray kaolin clay. However, the use of other anionic carboxylic collector reagents is also within the scope of this invention. As examples of such anionic reagents may be mentioned red oil (oleic acid of animal origin), linoleic acid and sulfo-oleic acid. Preferably a solution of an oil-soluble, water-insoluble petroleum sulfonate in a neutral hydrocarbon oil, such as mineral oil, is used to improve the collection by the fatty acid collector. Petroleum sulfonates are prepared by sulfonation, usually with concentrated or fuming sulfuric acid, of certain petroleum fractions and are commercially available in form of sodium, calcium, barium and ammonium salts, neutral or not neutral, and of varying solubility properties depending on the molecular weight. The use of a salt of the group of ammonium sulfate, magnesium sulfate and potassium salt is also recommended. The reagentization can be carried out in any suitable apparatus ordinarily used for reagentizing ores and minerals, such apparatus being well known to those skilled in the art and being fully described in the literature.

Flotation is carried out in an alkaline circuit, preferably at a pH within the range of 8 to 10. During flotation colored impurities originally in the clay are carried upward into the froth in intimate association with the oiled auxiliary mineral particles. The froth is separated from the tailing or machine discharge product which comprises a dispersion of oxidized clay particles. The oxidized clay particles in the machine discharge are usually appreciably darker than the starting clay in spite of the fact that colored impurities indigenous to the clay have been floated from the clay. The solids in the machine discharge product of the flotation operation are fairly dilute, usually well below 10 percent solids.

As mentioned, the dispersed machine discharge product can be subjected to a hydraulic sizing operation to recover a fine size fraction of clay especially suitable for paper coating use, e.g., a fraction that is at least about 90 percent finer than 2 microns. The machine discharge product, or a desired size fraction thereof, is then thickened in order that the subsequent bleaching step can be carried out economically. To thicken the clay, a clay flocculating agent is incorporated in the pulp. As the flocculating agent, conventional clay flocculating agent such as alum, ammoniated alum or sulfuric acid can be used. However, markedly superior results are realized when sulfur dioxide is used as the flocculating agent and as an agent to reduce any excess permanganate in the pulp. In this case, extensive bleaching and flocculation of the clay pulp occur substantially simultaneously. The flocculated clay pulp is then concentrated by removal of water therefrom until the clay solids of the pulp is about 15 percent to 20 percent.

The flocculated clay pulp can be further brightened by bleaching with any of the usual hydrosulfurous compound bleaching reagents, e.g., zinc hydrosulfite or sodium hydrosulfite. When floccing agents other than sulfur dioxide are used, it will be essential to use the hydrosulfurous bleaching compound. In many instances where sulfur dioxide is used as the floccing agent, the pulp can be further brightened by the hydrosulfurous compounds. If desired, the hydrosulfite bleaching reagent can be formed in situ in the slip by interaction of a metallic powder, such as zinc dust, with sulfurous acid or a salt of sulfurous acid. Sulfoxylates, which are compounds formed by reaction of aldehydes with metal salts of hydrosulfurous acid, such as sodium formaldehyde sulfoxylate, can also be used as the hydrosulfurous bleaching compound.

The bleached clay slurry can be flocced with acid material such as mineral acid or alum if the slurry is not adequately flocced for filtration. The clay is then filtered and dried or, if desired, the filtered clay can be redispersed, as with a polyphosphate dispersant, and supplied in slurry form.

The following examples are given for illustrative purposes.

In the examples, brightness index refers to values obtained by TAPPI Standard Method T–646 m–54, as described on pp. 159A and 160A of the October 1954 issue of TAPPI (a monthly publication of the Technical Association of the Pulp and Paper Industry). The method measures the light reflectance of a clay sample and thus gives a quantitative indication of its brightness or whiteness.

All reagent quantities are reported as pounds per ton of dry clay feed unless otherwise indicated.

Example I

This example illustrates the noteworthy improvement in brightness of a crude gray kaolin clay that can be obtained by activating a slip of the clay with potassium permanganate before subjecting the clay to a reducing bleach treatment without a flotation step. The clay employed in the tests was a gray kaolin clay which could not be brightened by more than about 2 percent by carrier flotation alone.

Preparation of slip of crude gray kaolin

Crude gray kaolin clay from a deposit near McIntyre, Ga., was crushed to pass a 4-mesh screen. The crushed clay was mixed with water. Three-tenth percent sodium silicate, based on the dry clay weight, was added and the mixture agitated with a paddle-type agitator until the clay was completely dispersed. The clay slip was screened on a 325-mesh screen to remove grit and coarse agglomerates. The minus 325 mesh sample was diluted with additional water to about 25 percent solids. The brightness index of the degritted gray kaolin was 78.0 percent. This dispersed slip of impure gray kaolin clay was used in Part A and Part B of this example.

A. Bleaching with zinc hydrosulfite alone

A bleach liquor was prepared by acidifying 500 milliliter distilled water with sulfur dioxide gas to a pH of about 1.3. One gram of zinc metal dust was added to the acid solution and stirred until all of the zinc dissolved.

Various quantities of the zinc hydrosulfite bleach liquor were added to 372 milliliter portions of the slip of gray kaolin (containing 88 grams of clay, dry clay basis). Each slip containing bleach liquor was stirred for 10 minutes, filtered and the filter cake washed with about 50 milliliters water. The washed filter cake was dried at 175° F., then pulverized and the brightness determined on a spectrophotometer.

It was found that with this particular sample of gray kaolin, optimum brightening took place with a ratio of 1 volume of zinc hydrosulfite bleach liquor to 6 volumes of 25 percent solids clay slip, whereby the clay brightness was increased to 79.7 percent (Sample No. 1). Employing bleach liquor in amounts corresponding to bleach liquor volume/slip volume ratios of 1:2 to 1:5, the brightness of the clay products were within the range of 79.2 percent to 79.7 percent. Accordingly, in subsequent tests showing the effect of permanganate treatment on hydrosulfite bleaching of this clay, about 1 part (volume) of the zinc hydrosulfite bleach liquor was used with 6 parts of the slip of gray kaolin.

B. Activation with permanganate and bleaching with zinc hydrosulfite without carrier floation 372 milliliter portions of the 25 percent solids dispersed gray kaolin slip were acidified with hydrochloric acid to a pH of 3.0. Various quantities of potassium permanganate were added to the clay slips and each slip was stirred for an hour at room temperature (70° F.–80° F.). After stirring the slip, zinc hydrosulfite bleach liquor was added, using 60 milliliters of the bleach liquor to 372 milliliters of 25 percent clay solids slip. The slips were stirred to 10 minutes, filtered, washed with 50 milliliters water, dried at 175° F., pulverized and tested for brightness.

Brightness data for Samples 1 through 5 are summarized in Table I.

TABLE I.—THE EFFECT OF PERMANGANATE ADDITION ON BRIGHTNESS OF ZINC HYDROSULFITE BLEACHED CRUDE GRAY KAOLIN
[Room temperature treatment]

| Sample No. | 1 | 2 | 3 | 4 | 5 |
|---|---|---|---|---|---|
| Potassium permanganate, lb./ton dry clay | 0.0 | 0.57 | 1.14 | 2.28 | 4.56 |
| Percent brightness index | 79.7 | 80.6 | 81.5 | 82.1 | 82.3 |
| Percent improvement in brightness index over brightness of crude clay | 1.7 | 2.6 | 3.5 | 4.1 | 4.3 |

Data in Table I for a crude gray kaolin which could be brightened by only 1.7 percent by hydrosulfite bleaching alone (Sample No. 1), show that this clay could be brightened by 2.6 percent to 4.3 percent by combined permanganate treatment and hydrosulfite bleachings (Samples No. 2 to 5). In other words, hydrosulfite bleaching was about 1½ to 2½ times as effective when the clay was given a preliminary permanganate bleach at room temperature.

The procedure used in producing Samples 1 to 5 was repeated with the exception that the clay slips were heated to 200° F. before permanganate addition and the temperature of the slip maintained above 180° F. but below 200° F. during permanganate treatment and during hydrosulfite bleaching. The results of these tests (Samples No. 6 to 11) are summarized in Table II.

TABLE II.—THE EFFECT OF PERMANGANATE ADDITION ON BRIGHTNESS OF ZINC HYDROSULFITE BLEACHED CRUDE GRAY KAOLIN
[Elevated temperature treatment]

| Sample No. | 6 | 7 | 8 | 9 | 10 |
|---|---|---|---|---|---|
| Potassium permanganate, lb./ton dry clay | 0.0 | 0.57 | 1.14 | 2.28 | 4.56 |
| Percent brightness index | 80.0 | 81.0 | 81.6 | 82.5 | 83.8 |
| Percent improvement in brightness index over brightness of crude clay | 2.0 | 3.0 | 3.6 | 4.5 | 5.8 |

Data in Table II for bleaching opertions carried out at elevated temperature show that a 50 percent increase in effectiveness of the hydrosulfite reagent was realized by incorporation of only 0.57 pound per ton of potassium permanganate. The data show also that when the permanganate was used in amount of 4.56 pounds per ton, the hydrosulfite bleach was almost three times as effective as it was in the absence of a permanganate pretreatment.

A comparison of results in Table II for runs at elevated temperature with results in Table I for runs made at room temperature show that the combined permanganate-hydrosulfite treatment was more effective at all levels of permanganate addition when the treatment was carried out at elevated temperature. This was especially true at higher levels of permangante addition where a maximum clay brightness of 83.8 percent was obtained, as compared with a maximum brightness of 82.3 percent obtained at room temperature operation. Since the hydrosulfite bleach alone was only slightly more effective at elevated temperature (brightness value of 80.0 percent at elevated temperature as compared with a brightness of 79.7 percent at room temperature), it appears that it was the operation of the permanganate treatment step at elevated temperature that accounted for the improved results with the whole process conducted at elevated temperature.

Example II.—Permanganate activation of flotation-beneficiated clay followed by reducing bleach A sample of the slip of 78.0 percent brightness crude degritted Georgia gray kaolin of Example I was initially beneficiated by the froth flotation procedure of U.S. 3,072,255, following the procedure of Example I of said patent wherein a slip of the clay was sulfidized with hydrogen sulfide, the sulfidized pulp conditioned with finely divided calcium carbonate and crude tall oil, and the pulp subjected to froth flotation in an alkaline circuit to produce a beneficiated clay as the machine discharge product. The brightness of the beneficiated clay product was 84.4 percent.

Five 50 gram charges (dry basis) of the beneficiated crude gray kaolin clay were acidified with a saturated aqueous solution of chlorine using 5 pounds of chlorine per ton of dry clay. Each charge was stirred for ten minutes. To portions of each acidified charge of beneficiated gray kaolin clay there were added various quantities of potassium permanganate. The slurries were stirred for thirty minutes and then 27 milliliters of the zinc hydrosulfite bleach liquor was added to each sample and stirred for ten minutes. The samples were filtered and dried, with the results summarized in Table III.

The above experiments were repeated except that the clay slurries were heated to 180° F. before addition of permanganate. Heating was then discontinued and the slip permitted to cool during the bleaching process. The results are summarized in Table IV.

TABLE III.—THE EFFECT OF PERMANGANATE ADDITION ON BRIGHTNESS OF ZINC HYDROSULFITE BLEACHED, FLOTATION-BENEFICIATED GRAY KAOLIN

[Room temperature tests]

| Sample No | 11 | 12 | 13 | 14 | 15 |
|---|---|---|---|---|---|
| Potassium permanganate, lb./ton dry clay | 0.0 | 1.0 | 2.0 | 4.0 | 8.0 |
| Percent brightness index | 86.0 | 87.1 | 87.4 | 87.2 | 88.0 |
| Percent improvement in brightness index over beneficiated clay | 1.6 | 2.7 | 3.0 | 2.8 | 3.6 |
| Percent improvement in brightness index over crude clay | 8.0 | 9.1 | 9.4 | 9.2 | 10.0 |

TABLE IV.—THE EFFECT OF PERMANGANATE ADDITION ON BRIGHTNESS OF ZINC HYDROSULFITE BLEACHED, FLOTATION-BENEFICIATED GRAY KAOLIN

[Tests with clay slip preheated to 180° F.]

| Sample No | 16 | 17 | 18 | 19 | 20 |
|---|---|---|---|---|---|
| Potassium permanganate, lb./ton dry clay | 0.0 | 1.0 | 2.0 | 4.0 | 8.0 |
| Percent brightness index | 86.4 | 87.0 | 88.5 | 88.2 | 88.8 |
| Percent improvement in brightness index over beneficiated clay | 2.0 | 2.6 | 4.1 | 3.8 | 4.4 |
| Percent improvement in brightness index over crude clay | 8.4 | 9.0 | 10.5 | 10.2 | 10.8 |

Results in Table III and Table IV show the brightness of flotation-beneficiated gray kaolin clay could be further increased to a considerable extent by a permanganate-hydrosulfite treatment at room temperature or at elevated temperatures, results that could not be realized with hydrosulfite bleaching alone. A comparison of the results for room temperature and elevated temperature bleaching operations show that operation at elevated temperature resulted in a 4.4 percent improvement in brightness of the beneficiated gray clay to a value of 88.8 percent, a result that was not obtained with room temperature operation where a 3.6 percent improvement in brightness was obtained with the same quantity of reagents.

*Example III.—Activation with permanganate followed by carrier flotation and reducing bleach*

500 gram samples of the degritted gray kaolin slip of Example I were slipped with water at about 21 percent solids in glass containers. No clay dispersant was present in the slips. Various quantities of potassium permanganate were added to the slips in the form of an aqueous solution containing 1 percent $KMnO_4$. The slips were agitated by mild paddle agitation or in a Fagergren flotation cell (high speed agitation) for the times indicated in Table V. In each case, the slip changed from a gray color to a rich brown color after it had been reacted with permanganate.

To each permanganate treated slip, there was added a 150 gram portion of calcium carbonate that had been hydraulically classified to mean particle size of 2.5 microns (Atomite). The pulp was agitated in a Fagergren flotation machine with the air off. To the agitating pulp, the following flotation reagents were added in the order listed.

| Reagent: | Pounds reagent per ton of dry clay feed |
|---|---|
| $Na_2CO_3$ | 8.0 |
| $Na_2SiO_3$ | 4.0 |
| $(NH_4)_2SO_4$ | 6.0 |
| $NH_4OH$ | 2.0 |
| Added as 50/50 mixture: Crude tall oil and a 50 percent solution of neutral oil-soluble petroleum sulfonate in white mineral oil | 12.4 |
| Crude tall oil—added separately from mixture | 1.2 |

Each pulp was conditioned for a total of seventeen minutes. The pulps were 22.1 percent solids during conditioning and their pH varied between 8.5 to 8.6, depending upon the amount of permanganate that had been added. During conditioning, each pulp turned a deeper brown color which was retained throughout the subsequent flotation step.

Each conditioned pulp was transferred to a 1000 gram Minerals Separation Airflow flotation machine and subjected to flotation, removing a froth product for 10 minutes. The pulp remaining in the flotation machine was discharged and the froth was repulped in the flotation machine and floated for 10 minutes. This procedure was repeated twice. The machine discharge products were combined to produce a final beneficiated kaolin clay product. Substantially all of the calcium carbonate reported in the froth product along with colored impurities in the clay feed material.

The combined machine discharge product of each flotation was flocced and simultaneously bleached by bubbling sulfur dioxide gas therein. The sulfur dioxide flocced pulps were then bleached with zinc hydrosulfite as in Example I.

The results of these experiments are reported in Table V.

TABLE V.—EFFECT OF PERMANGANATE ACTIVATION ON BENEFICIATION OF GRAY KAOLIN CLAY BY CARRIER FLOTATION AND REDUCING BLEACH

| Activation Step | | Machine Discharge Clay Products | | | |
|---|---|---|---|---|---|
| $KMnO_4$, lb./ton | pH of Permanganate Treated Slip | Percent Wt. | Brightness After Being Flocced With $SO_2$, percent | Brightness After Zn Hydrosulfite Bleach percent | ΔB | ΔT |
| 8.0 [1] | 3.9 | 73.0 | 85.5 | 86.8 | 1.3 | 8.8 |
| 2.0 [2] | 3.9 | 88.4 | 86.4 | 87.5 | 1.1 | 9.5 |
| 4.0 [2] | 3.9 | 83.4 | 87.2 | 88.2 | 1.0 | 10.2 |
| 2.0 [3] | 4.4 | 86.4 | 85.9 | | | |

[1] Mild agitation, 19 hours.
[2] Mild agitation, 67 hours.
[3] Intense agitation in Fagergren machine, 10 minutes.
ΔB = Percent increase in brightness of $SO_2$ flocced clay after hydrosulfite bleach.
ΔT = Total percent increase in clay brightness.

Data in Table V show that the brightness of the gray kaolin clay could be increased by 10.2 percent to a value of 88.2 percent at an excellent 83.4 percent weight recovery by activating the clay with 4 pounds per ton of potassium permanganate before floating impurities from the clay and bleaching the sulfur dioxide flocced flotation beneficiated clay with zinc hydrosulfite. By omitting the zinc hydrosulfite bleach and using sulfur dioxide as the sole reducing bleach, the clay was brightened a total of 9.2 percent to an excellent brightness value of 87.2 percent.

Data in Table V also show that when permanganate was used in amount of 4 pounds per ton of clay, the grade of beneficiated clay in the sulfur dioxide flocced machine discharge product was superior to the grade of beneficiated clay when 2 pounds per ton of permanganate activating agent was used with the same contact period of 67 hours. Data indicate that 4 pounds of permanganate with mild agitation for 67 hours was superior to 8 pounds of permanganate with mild agitation for 19 hours.

Data in Table V also indicate that clay grade was generally superior with mild agitation for long periods than with strong agitation for short periods.

A comparison of data in Table V for clay processed in accordance with the preferred embodiment of this invention by permanganate activation, flotation and then reducing bleach with data in Table I for the same clay bleached with hydrosulfite alone, show that the clay could be brightened by 10.2 percent by the process of this invention, as compared with an improvement of only 1.7 percent by bleaching alone. In effect, the process of this invention was six times as effective as reducing bleaching alone. A comparison of data in Table V with data in Table I for permanganate activation at room temperature and hydrosulfite bleaching without flotation show that the combination of permanganate and hydrosulfite bleaching was more than twice as effective when a flotation step intervened.

Data in Table V for a preferred form of the invention in which permanganate activation precedes flotation and sulfidization is omitted were compared with data in Table III for the process, also within the scope of this invention, including flotation of a sulfidized slip of gray kaolin clay followed by permanganate activation and then zinc hydrosulfite reducing bleach. The comparison shows that with the latter sequence of steps, 8 pounds of permanganate was required per ton of clay in order to bleach the gray clay to at least 88 percent brightness (Sample No. 15) while the same result could be realized with half the quantity of permanganate when operating in accordance with the preferred sequence of steps. Moreover, when carrying out the permanganate treatment before flotation and reducing bleach treatment, the use of chlorine and hydrogen sulfide reagents was avoided without detrimental effect.

*Example IV.—Activation with permanganate followed by carrier flotation, hydroclassification and reducing bleach, also in accordance with preferred embodiment of invention*

The gray Georgia kaolin of the previous examples was brightened to an exceptional brightness of 90.2 percent as follows.

The raw clay, without any pretreatment, was slipped in water at about 25 percent clay solids without a dispersant. Potassium permanganate was added to the slip as 1 percent aqueous solution in amount of 2.0 pounds $KMnO_4$ per ton of clay. The slip was placed in a plastic jar and was agitated by rotating the jar on a roller arrangement for about 16 hours without application of heat. The permanganate treated slip was dispersed by adding soda ash in an amount of 8.0 pounds per ton of clay and sodium silicate ("O Brand") in amount of 4.0 pounds per ton of clay. The dispersed slip was passed through a 325-mesh screen to eliminate grit. Five hundred grams of the minus 325 slip was conditioned for flotation by adding: 150 grams of calcium carbonate classified to a mean particle size of about 5 microns; ammonium sulfate in amount of 6.0 pounds per ton of clay; an aqueous emulsion containing 4.0 pounds ammonium hydroxide, 6.2 pounds of distilled refined tall oil containing about 70 percent fatty acids and 25 percent rosin acids, and 6.2 pounds of a solution of neutral petroleum sulfonate in an equal weight of mineral oil; and 8.0 pounds per ton of lubricating oil (Eureka M). (All reagents reported as pounds per ton of clay in the slip.) The pulp at 20.0 percent solids was then conditioned for 17 minutes in a Fagergren flotation cell. The pH of the conditioned pulp was 8.45.

The pulp was subjected to froth flotation in a 1000 gram Minerals Separation Airflow flotation machine, removing a froth product for 10 minutes. The pulp remaining in the flotation machine was discharged and the froth was repulped in the flotation machine and floated for 10 minutes. The procedure was repeated twice. The machine discharge products were combined and fractionated by beaker sedimentation to recover an aqueous slip of a fine size fraction clay that was at least 92 percent by weight finer than 2 microns, equivalent spherical diameter as determined by the Casagrande method. This slip of the fine clay fraction was flocced by gassing it with sulfur dioxide to a pH of 3.0. The flocced slip was then bleached with zinc hydrosulfite.

The brightness of the fine size fraction of clay after treatment with sulfur dioxide and before hydrosulfite bleach was 88.5 percent, an increase of 10.5 percent over the 78.0 percent brightness of the minus 325 mesh portion of the starting gray clay. After hydrosulfite bleaching, the brightness of the fine size fraction of clay was 90.2 percent, a value comparing favorably with the brightness value of the highest grades of beneficated white kaolin clay.

*Example V.—Activation with various oxidizing agents*

Tests were carried out to demonstrate the effectiveness of various oxidizing agents in the pretreatment of a slip of gray kaolin clay for carrier flotation and zinc hydrosulfite bleaching. The oxidizing agents used were oxygen gas, hydrogen peroxide, sodium peroxide and sodium chlorite. The effectiveness of these agents was compared with that of potassium permanganate.

The benefication was as follows:

The raw clay as received was slipped in water at about 25 percent clay solids. Oxidizing agent was added to the clay slip in amount of 2.0 pounds of oxidizing agent per ton of clay in the slip. The slip was then agitated at room temperature for 17 hours.

Each oxidized slip was then processed by degritting on a 325-mesh screen, dispersion of the degritted slip, flotation, bleaching a portion of the combined flotation machine discharge products with zinc hydrosulfite, fractionating the remaining portion of the combined flotation machine discharge products by sedimentations, recovering a slip of fine size fraction of clay, floccing the slip of fine size clay with sulfur dioxide and then bleaching the slip of fine size clay with zinc hydrosulfite. The conditions and reagents used in dispersion, flotation, hydrosulfite bleaching and fractionation are those described in the previous example.

The results, summarized in Table VI, show that all of the oxidizing agents improved the brightness of gray clay beneficiated by carrier flotation and reducing bleach. The improvement was especially noteworthy in the case of the fine fraction of the gray clay that was separated from the whole clay after flotation. The data show that when used in amount of 2 pounds oxidant per ton, potassium permanganate was the most effective of the oxidizing agents tested, followed by sodium chlorite.

TABLE VI.—COMPARISON OF OXIDANTS IN THE ACTIVATION OF GRAY KAOLIN CLAY BEFORE FLOTATION AND REDUCING BLEACH

|  | Oxidant | | | | | |
| --- | --- | --- | --- | --- | --- | --- |
|  | None | Sodium Peroxide | Oxygen Gas | Hydrogen Peroxide | Sodium Chlorite | Potassium Permanganate |
| Combined MD's, percent wt | 90.0 | 93.0 | 88.2 | 98.6 | 86.0 | 92.0 |
| Brightness, percent: |  |  |  |  |  |  |
| Untreated minus 325-mesh crude | 78.8 | 78.8 | 78.8 | 78.8 | 78.8 | 78.8 |
| Oxidant-treated minus 325-mesh crude | 78.8 | 79.0 | 78.8 | 79.9 | 79.7 | 81.8 |
| Combined MD's | 84.6 | 84.7 | 84.5 | 83.9 | 86.8 | 87.1 |
| Combined MD's bleached | 85.5 | 85.8 | 85.6 | 85.6 | 87.1 | 88.1 |
| SO₂ flocced fine fraction | 85.7 | 86.1 | 85.8 | 85.9 | 87.6 | 88.7 |
| Bleached fine fraction | 86.8 | 86.9 | 87.0 | 87.3 | 88.0 | 89.8 |
| ΔT of bleached fine fraction | 8.0 | 8.1 | 8.2 | 8.5 | 9.2 | 11.0 |

ΔT=Total percent increase in clay brightness.

I claim:

1. A method for increasing the brightness of gray kaolin clay containing colored impurities which comprises
providing an aqueous slip consisting essentially of water, said clay and a water-soluble inorganic compound containing molecularly available oxygen, agitating said slip until oxidation takes place and thereafter subjecting an aqueous slip of said clay to the action of a reducing bleaching agent.

2. A method for increasing the brightness of gray kaolin clay which comprises
forming an acidic aqueous slip of gray kaolin clay containing a water-soluble permanganate salt,
maintaining the slip in contact with said permanganate salt until the color of the aqueous phase of the slip is brown,
and subjecting the slip thus treated to the action of a hydrosulfurous compound bleaching reagent.

3. The method of claim 2 wherein the gray kaolin clay has been beneficiated by froth flotation before incorporation of permanganate salt into a slip of the clay.

4. The method of claim 2 in which hydrosulfurous compound is a hydrosulfite.

5. The method of claim 2 in which the hydrosulfurous compound is zinc hydrosulfite.

6. The method of claim 2 in which the clay slip is maintained in contact with said permanganate salt at elevated temperature below the boiling point of the slip.

7. A method for increasing the brightness of gray kaolin clay which comprises
incorporating potassium permanganate into an aqueous slip of gray kaolin clay,
aging the clay slip containing permanganate salt while maintaining the slip acid and while agitating said slip until the color of the aqueous phase of the slip is brown,
and subjecting the slip thus treated to the action of a hydrosulfite bleaching reagent.

8. A method for increasing the brightness of gray kaolin clay which comprises incorporating potassium permanganate into an aqueous slip of crude gray kaolin clay,
agitating the slip at elevated temperature while maintaining the slip acid until the permanganate in the slip is reduced,
and subjecting the slip to the action of hydrosulfite bleaching reagent.

9. A method for increasing the brightness of discolored gray kaolin clay which comprises
forming a slip of clay by agitating gray kaolin clay in water without incorporating a dispersing agent therein,
incorporating potassium permanganate into said slip of clay with agitation,
agitating said slip until the aqueous phase becomes brown,
and thereafter subjecting said clay to the action of a hydrosulfurous bleaching compound.

10. In a method for improving the brightness of gray kaolin clay which comprises the steps of providing an aqueous slip of said clay, incorporating a dispersing agent therein, conditioning said dispersed aqueous slip of the clay for froth flotation with a collector reagent selective to colored impurities in said clay, subjecting the conditioned slip to froth flotation thereby producing a froth product which is a concentrate of colored impurities originally in said clay and a machine discharge product which is a concentrate of clay of enhanced brightness, and further increasing the brightness of clay in said machine discharge product by bleaching it with a reducing agent, the improvement which comprises
activating said aqueous slip of gray kaolin clay for flotation and bleaching by forming an aqueous slip consisting essentially of water, said clay and a water-soluble inorganic compound containing molecularly available oxygen, before said slip is conditioned for froth flotation, and agitating said slip until clay in said slip darkens substantially, whereby the slip thus darkened will brighten to a greater extent by combined flotation and treatment with reducing agent than it would in the absence of said activating treatment.

11. The method of claim 10 wherein said slip is conditioned for froth flotation with a fatty acid and with finely divided solid additive particles capable of being coated with said fatty acid.

12. In a method for improving the brightness of gray kaolin clay which comprises the steps of providing an aqueous slip of said clay, incorporating a dispersing agent therein, conditioning said dispersed aqueous slip of the clay for froth flotation with a collector reagent selective to colored impurities in said clay, subjecting the conditioned slip to froth flotation in an alkaline circuit, thereby producing a froth product which is a concentrate of colored impurities originally in said clay and a machine discharge product which is a concentrate of clay of enhanced brightness, and further increasing the brightness of clay in said machine discharge product by bleaching it with a hydrosulfurous compound,
the improvement which comprises activating said slip for flotation and bleaching by incorporating potassium permanganate into said slip before said dispersant is incorporated into said slip and before said slip is conditioned with said collector reagent, and agitating said slip containing said potassium permanganate until said slip darkens substantially, whereby the slip thus activated will brighten to a greater extent by combined flotation and treatment with hydrosulfurous compound than it would in the the absence of said activating treatment.

13. The method of claim 12 wherein said slip is conditioned for froth flotation with a fatty acid and with finely divided solid additive particles capable of being collector coated with said fatty acid reagent.

14. A method for increasing the brightness of gray kaolin clay containing colored impurities which comprises
forming an aqueous slip consisting essentially of water, said clay and a water-soluble inorganic compound containing molecularly available oxygen, and agitating said slip with said compound until said slip darkens appreciably,
incorporating a clay dispersing agent into said slip and agitating said slip,
conditioning said dispersed slip for froth flotation with collector reagents selective to colored impurities in said slip,
subjecting said slip thus conditoned to froth flotation in an alkaline pulp, thereby forming a froth product which is a concentrate of colored impurities originally in said clay and a machine discharge product which is a dispersed concentrate of kaolin clay of darker color than the starting clay,
and incorporating sulfur dioxide into said machine discharge product, thereby producing a flocculated slip of kaolin clay which is appreciably brighter than a slip of the starting clay.

15. A method for increasing the brightness of gray kaolin clay containing colored impurities which comprises
incorporating potassium permanganate into an aqueous slip of said clay and agitating said slip with said compound until said slip darkens appreciably,
incorporating a clay dispersing agent into said slip and agitating said slip,
conditioning said dispersed slip for froth flotation with collector reagents selective to colored impurities in said slip,
subjecting said slip thus conditioned to froth flotation in an alkaline pulp, thereby forming a froth product which is a concentrate of colored impurities originally in said clay and a machine discharge product which is a dispersed concentrate of kaolin clay of darker color than the starting clay,
incorporating sulfur dioxide into said machine discharge product, thereby producing a flocculated slip of kaolin clay which is appreciably brighter than a slip of the starting clay,
and further bleaching the machine discharge product with a hydrosulfite bleaching reagent.

16. A method for increasing the brightness of gray kaolin clay containing colored impurities which comprises
dispersing said clay by agitating the clay in water in the presence of a dispersing agent,
conditioning said dispersed slip for froth flotation with a fatty acid collector reagent selective to colored impurities in said slip and with finely divided mineral particles capable of being collector coated with said fatty acid reagent,
subjecting said slip thus conditioned to froth flotation in an alkaline pulp, thereby forming a froth product which is a concentrate of colored impurities originally in said clay in intimate association with said finely divided mineral particles and a machine discharge product,
incorporating potassium permanganate into a slip of said machine discharge product with agitation until said slip darkens appreciably,
incorporating sulfur dioxide into said machine discharge, thereby producing a flocculated slip of gray kaolin clay which is appreciably brighter than a slip of the starting clay,
and further bleaching the machine discharge with a hydrosulfite bleaching reagent.

17. The method of claim 16 wherein said potassium permanganate is employed in amount of from about ½ to 10 pounds of potassium permanganate per ton of said clay.

18. A method for further brightening gray kaolin clay which has previously been partially brightened by forming a dispersed slip of the clay, conditioning said slip with (a) a collector reagent selective to colored impurities in the clay and (b) reagentized mineral particles floatable in the clay slip, and subjecting the slip thus reagentized to froth flotation in an alkaline circuit to produce a beneficiated clay machine discharge product, said method for further brightening said clay comprising
providing an aqueous slip of said beneficiated clay machine discharge product,
incorporating a water-soluble permanganate salt into said aqueous clay slip,
aging the clay slip containing permanganate salt while maintaining the slip acid until the slip is brown,
and subjecting the slip thus treated to the action of a hydrosulfurous compound bleaching reagent.

19. A method for further brightening gray kaolin clay which has previously been partially brightened by forming a dispersed slip of the clay, conditioning said slip with (a) a collector reagent selective to colored impurities in the clay and (b) reagentized mineral particles floatable in the clay slip, and subjecting the slip thus reagentized to froth flotation in an alkaline circuit to produce a beneficiated clay machine discharge product, said method for further brightening said clay comprising
providing an aqueous slip of said beneficiated clay machine discharge product,
incorporating a water-soluble permanganate salt into said aqueous clay slip,
aging the clay slip containing permanganate salt while maintaining the slip acid until the slip is brown,
incorporating a sufficient amount of sulfur dioxide into said slip to cause said slip to flocculate and the clay to brighten,
and subjecting the clay in said slip to the action of a hydrosulfurous compound, thereby effecting a further increase in the brigthness of said clay.

20. The method of claim 19 wherein said water-soluble permanganate salt is potassium permanganate which is employed in amount of from about ½ to 10 pounds of potassium permanganate per ton of said clay.

References Cited

UNITED STATES PATENTS

| | | | |
|---|---|---|---|
| 534,450 | 2/1895 | Clapham | 8—111 X |
| 1,888,701 | 11/1932 | Simcoe | 23—110 X |
| 1,926,045 | 9/1933 | Greeman | 209—166 |
| 2,053,329 | 9/1936 | Feldenheimer | 23—110 |
| 2,339,594 | 1/1944 | Williams | 106—72 X |
| 2,981,630 | 3/1961 | Rowland | 23—110 X |
| 2,990,958 | 7/1961 | Greene | 209—166 |
| 3,072,255 | 1/1963 | Greene | 209—166 |

FOREIGN PATENTS

| | | |
|---|---|---|
| 960,829 | 11/1949 | France. |
| 126 | 3/1877 | Great Britain. |

HARRY B. THORNTON, *Primary Examiner.*

R. HALPER, *Assistant Examiner.*